(12) United States Patent
Takahashi et al.

(10) Patent No.: US 7,686,358 B2
(45) Date of Patent: Mar. 30, 2010

(54) VEHICULAR BUMPER STRUCTURE

(75) Inventors: Hiroyuki Takahashi, Nishikamo-gun (JP); Motomi Iyoda, Seto (JP); Ryotaro Kachu, Nishikamo-gun (JP); Yujiro Miyata, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 555 days.

(21) Appl. No.: 10/584,084

(22) PCT Filed: Dec. 16, 2004

(86) PCT No.: PCT/JP2004/019281
§ 371 (c)(1),
(2), (4) Date: Jun. 22, 2006

(87) PCT Pub. No.: WO2005/061284
PCT Pub. Date: Jul. 7, 2005

(65) Prior Publication Data
US 2007/0114803 A1     May 24, 2007

(30) Foreign Application Priority Data
Dec. 24, 2003     (JP)     ............... 2003-427724

(51) Int. Cl.
*B60R 19/34*     (2006.01)

(52) U.S. Cl. ............... 293/102; 293/133; 296/187.09; 296/203.02

(58) Field of Classification Search ............... 293/102, 293/117, 120, 132, 133; 296/187.04, 187.09, 296/203.02; 180/271
See application file for complete search history.

(56) References Cited

U.S. PATENT DOCUMENTS

| 6,212,456 B1 | 4/2001 | Stride |
| 7,293,809 B2 * | 11/2007 | Suzuki et al. ............... 293/117 |

FOREIGN PATENT DOCUMENTS

| DE | 197 18 803 C1 | 10/1998 |
| DE | 101 13 720 A1 | 9/2002 |
| EP | 0 952 046 A2 | 10/1999 |
| EP | 0 978 425 A1 | 2/2000 |
| JP | A-61-188253 | 8/1986 |
| JP | U-62-088929 | 6/1987 |
| JP | A-11-028994 | 2/1999 |
| JP | A-2000-225907 | 8/2000 |

* cited by examiner

*Primary Examiner*—Lori L Lyjak
(74) *Attorney, Agent, or Firm*—Oliff & Berridge, PLC

(57) ABSTRACT

A vehicular bumper structure includes plural load detection sensors (28, 30, 32, 34, 52) disposed at predetermined intervals in a vehicle body vertical direction between a load transmitting plate (36, 50) disposed with a bumper touch sensor and a front wall portion (20C) of a bumper reinforcement. The load transmitting plate (36, 50) is configured so as to be displaced towards a vehicle body rear side with respect to the front wall portion (20C) of the bumper reinforcement (20).

5 Claims, 10 Drawing Sheets

VEHICULAR BUMPER STRUCTURE

BACKGROUND OF THE INVENTION

1. Field of the Invention

The present invention relates to a vehicular bumper structure. In particular, the present invention relates to a vehicular bumper structure that can detect a collision body in a vehicle such as an automobile.

2. Description of the Related Art

Conventionally, with respect to a vehicular bumper structure that detects a collision body in a vehicle such as an automobile, the following configuration has been known. This is a configuration where a groove that extends in a longitudinal direction is formed in the front surface of a bumper reinforcement, a collision detection sensor is housed inside this groove, a pair of upper and lower grooves are formed in the rear surface of an impact absorber, and a push-in portion with respect to the collision detection sensor is formed.

In this configuration, the entire areas of the upper portion and the lower portion of the pair of upper and lower grooves in the rear surface of the impact absorber abut against a front wall portion of the bumper reinforcement. Part of a load acting on the impact absorber is directly transmitted from the impact absorber to the bumper reinforcement via these abutment portions. For this reason, the load acting on the collision detection sensor is reduced.

SUMMARY OF THE INVENTION

In consideration of the above fact, there is room to raise the collision detection performance of the bumper. A vehicular bumper structure that can improve the collision detection performance is desired.

A vehicular bumper structure of the present invention includes: a bumper reinforcement that extends along a vehicle width direction; plural load detection sensors disposed at a vehicle body outer side surface of the bumper reinforcement; and a load transmitting plate disposed at vehicle body outer side surfaces of the plural load detection sensors.

When a collision body collides with the bumper, a load from the outside is transmitted, via the load transmitting plate disposed at the vehicle body outer side surfaces of the plural load detection sensors, to the plural load detection sensors disposed at the vehicle body outer side surface of the bumper reinforcement. The total collision load can be measured on the basis of each of the loads detected by the plural load detection sensors. Thus, it becomes possible to discriminate the collision body on the basis of the total value of the collision loads, and collision detection performance can be improved.

DETAILED DESCRIPTION OF THE INVENTION

Figure 1:
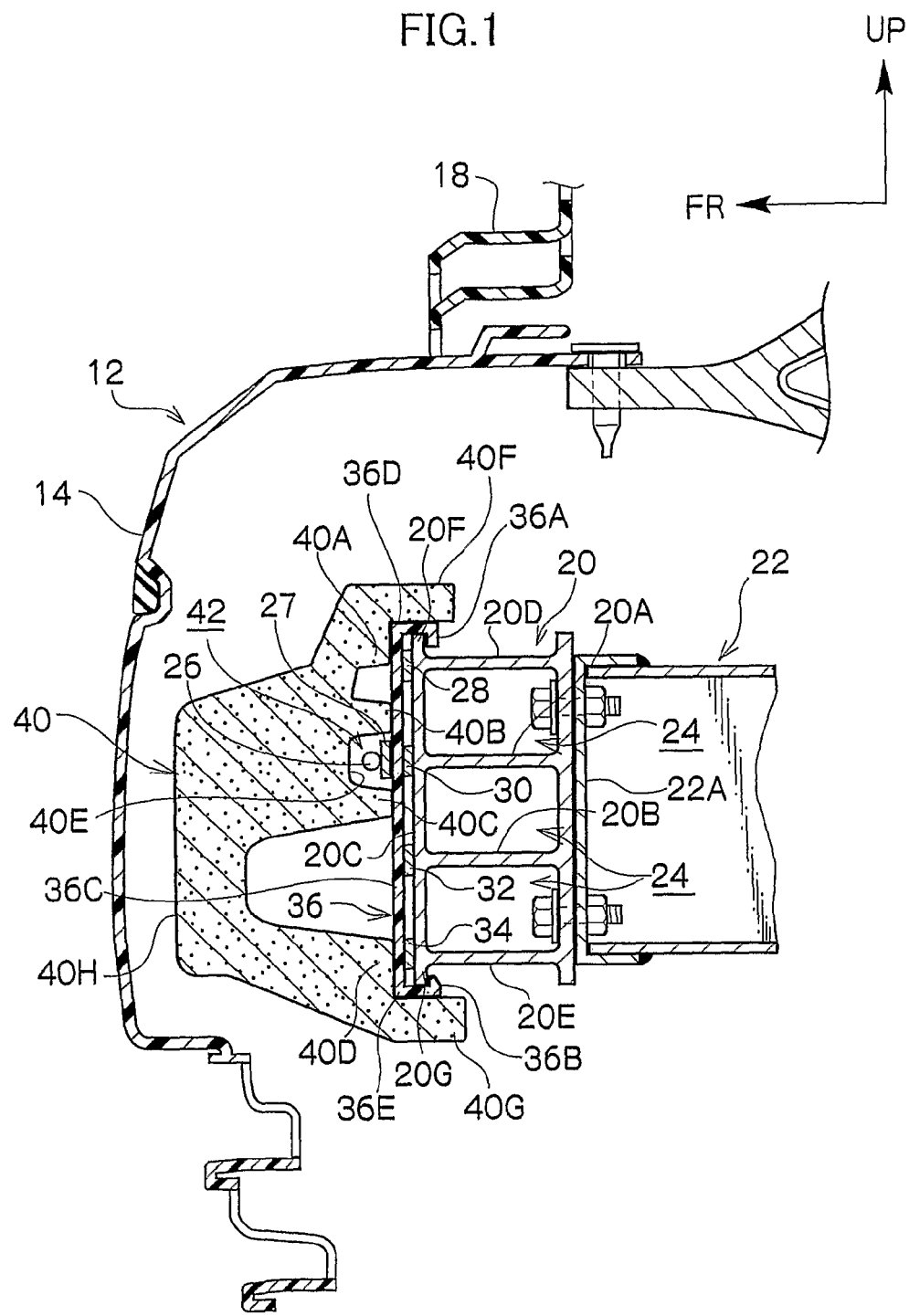
FIG. 1 is a side cross-sectional view showing a vehicular bumper structure pertaining to a first embodiment of the invention.

A first embodiment of a vehicular bumper structure of the invention will be described in accordance with FIGS. 1 to 5.

It will be noted that the UP arrow in the drawings represents a vehicle body upper direction, and that the FR arrow in the drawings represents a vehicle body front direction.

Figure 3:
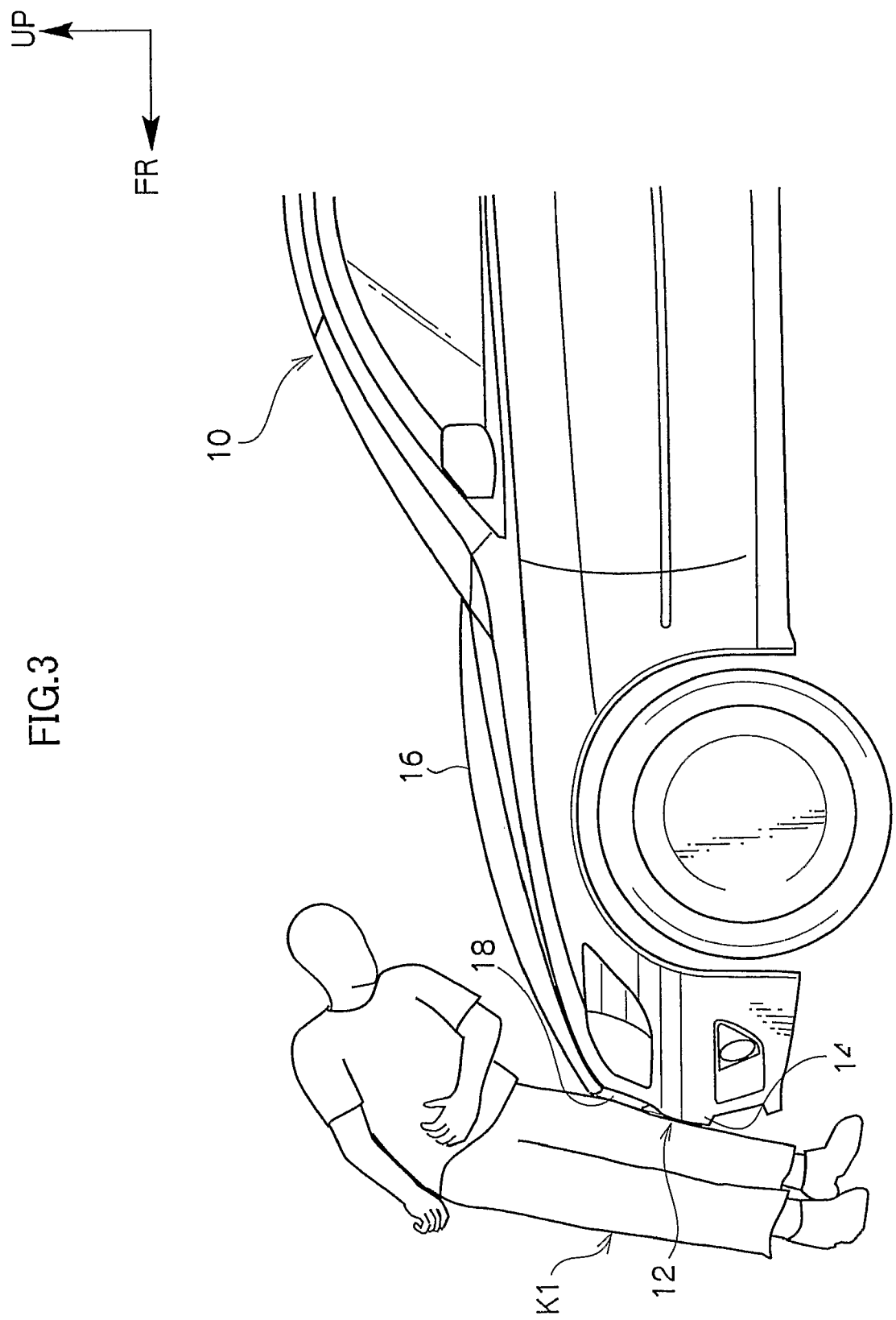
FIG. 3 is a side view showing a deformation state when a collision body contacts the upper side of the bumper in a vehicle body to which the vehicular bumper structure pertaining to the first embodiment of the invention has been applied.
Figure 4:
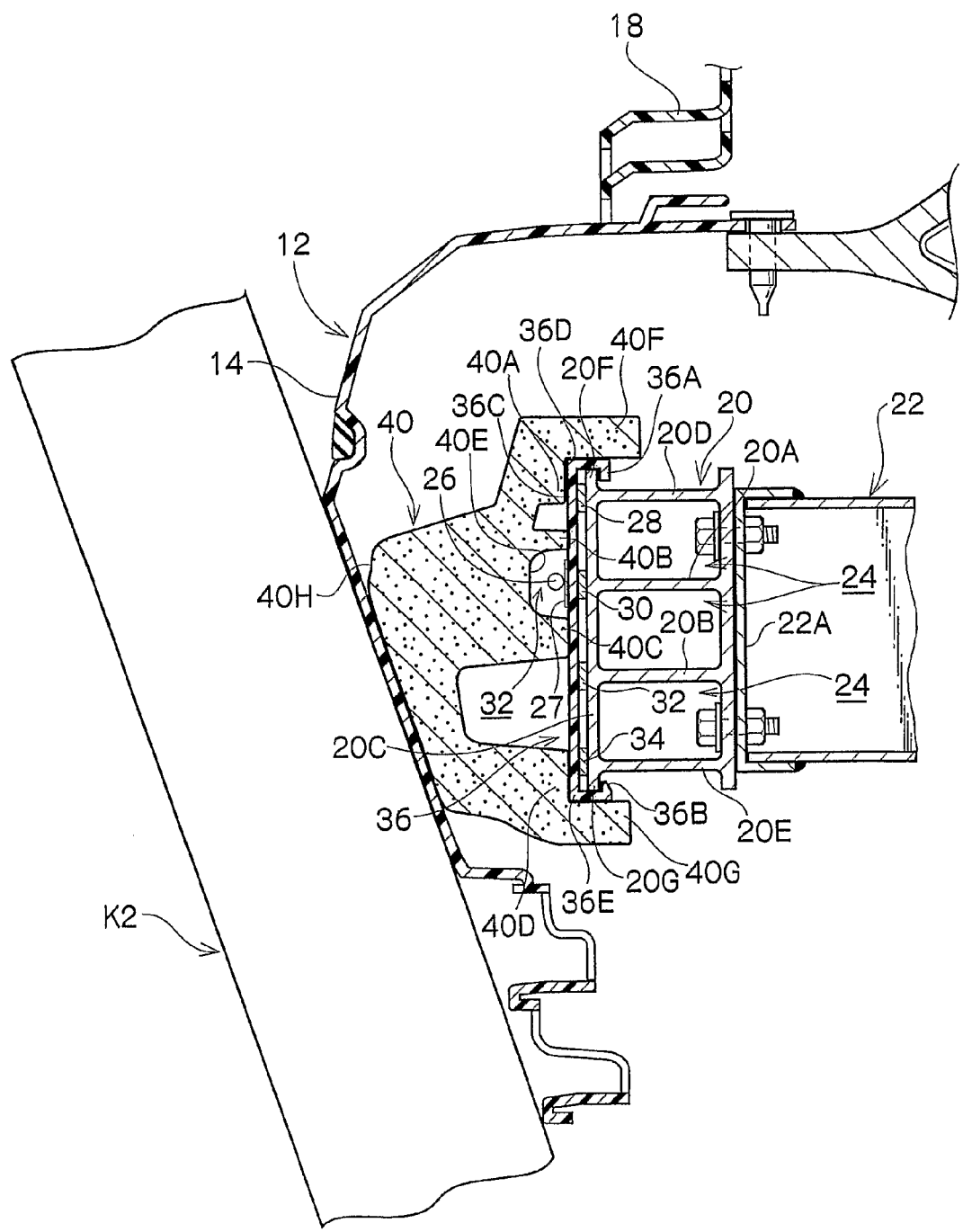
FIG. 4 is a side cross-sectional view showing a deformation state when a collision body contacts a lower side of the bumper in the vehicular bumper structure pertaining to the first embodiment of the invention.
Figure 5:
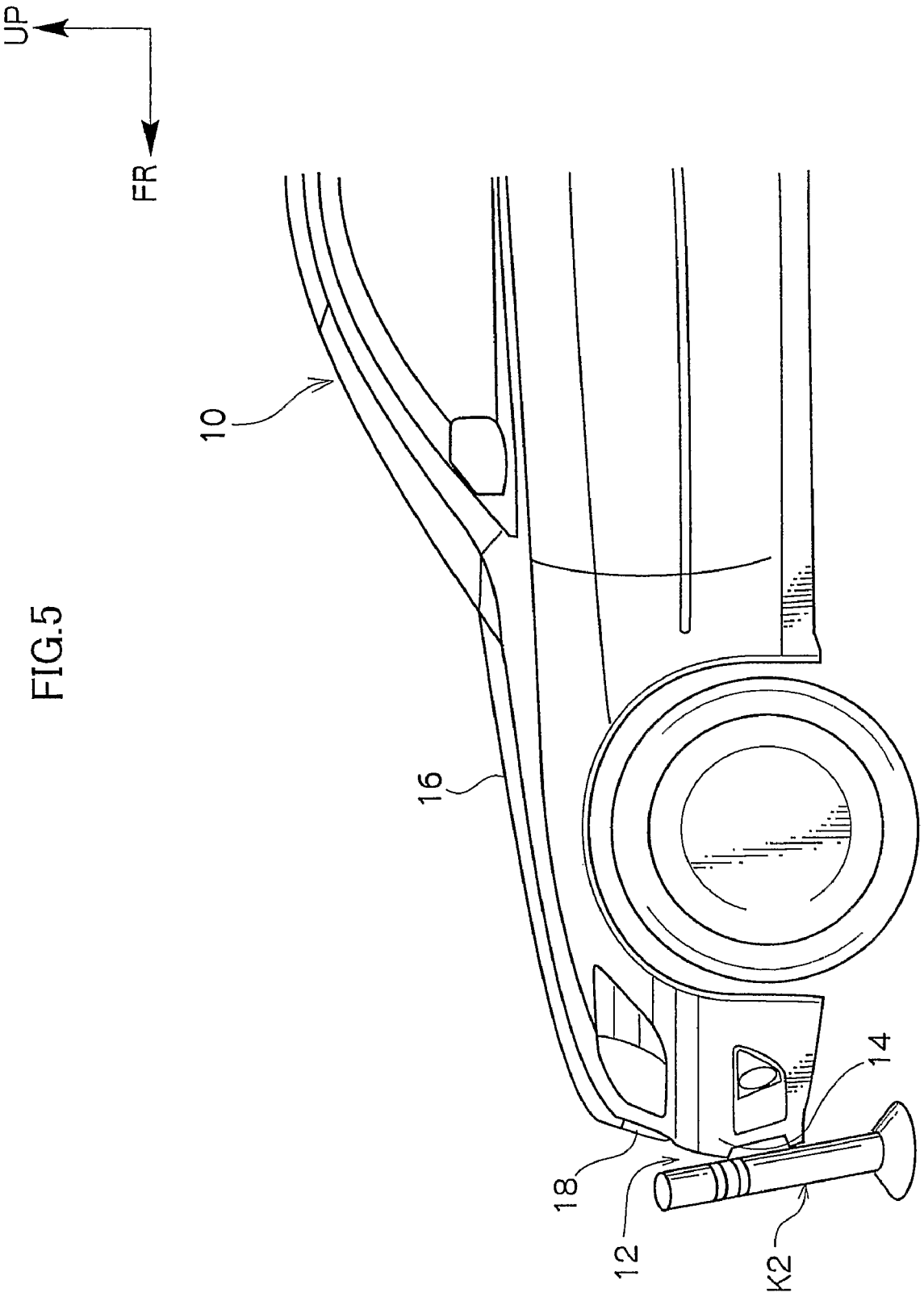
FIG. 5 is a side view showing a deformation state when a collision body contacts the lower side of the bumper in the vehicle body to which the vehicular bumper structure pertaining to the first embodiment of the invention has been applied.

A bumper cover 14 of a front bumper 12 is disposed along a vehicle width (horizontal) direction at a front end lower portion of an automobile body 10 of the present embodiment (FIG. 3). A grill 18 is disposed between a vehicle width-direction intermediate portion of the bumper cover 14 and a front end portion of a hood 16.

A bumper reinforcement 20 of the front bumper 12 extends along the vehicle width direction and is disposed across front end portions 22A of left and right front side members 22 (FIG. 1). The side section of the bumper reinforcement 20 includes a closed sectional portion 24. The closed sectional portion 24 is divided into three in the vertical direction by ribs 20A and 20B. The ribs 20A and 20B are formed along a vehicle body longitudinal direction at predetermined intervals in the vehicle body vertical direction.

Load (pressure) detection sensors 28, 30, 32 and 34 are disposed along the vehicle width direction at sites at vehicle body outer sides (front sides) of an upper wall portion 20D, the upper rib 20A, the lower rib 20B and a lower wall portion 20E of a front wall portion 20C of the bumper reinforcement 20.

A load transmitting plate 36 is disposed along the vehicle width direction at vehicle body front side surfaces (vehicle body outer side surfaces) of the load detection sensors 28, 30, 32 and 34. The load transmitting plate 36 is configured by, for example, a resinous material. The load transmitting plate 36 is configured with a predetermined rigidity. The load transmitting plate 36 is configured so that when a load acts on the vehicle body rear side from the vehicle body front side, the load transmitting plate 36 does not contact the front wall portion 20C of the bumper reinforcement 20 at sites between the load detection sensors 28, 30, 32 and 34.

Engagement pawls 36A and 36B are formed at both upper and lower end portions of the load transmitting plate 35. Due to these engagement pawls 36A and 36B, the load transmitting plate 36 is engaged, from the vehicle body front side, with an upper end edge portion 20F and a lower end edge portion 20G of the front wall portion 20C of the bumper reinforcement 20. Thus, the engagement pawls 36A and 36B prevent the load transmitting plate 36 from moving in the vehicle body vertical direction with respect to the bumper reinforcement 20. Moreover, when a load acts on the load transmitting plate 36 from the vehicle body front side towards the vehicle body rear side, the load transmitting plate 36 is displaced towards the vehicle body rear side with respect to the front wall portion 20C of the bumper reinforcement 20, whereby the load acts on each of the load detection sensors 28, 30, 32 and 34.

A bumper touch sensor 26 that serves as a collision detection sensor is disposed along the vehicle width direction at a site at the vehicle body front side (vehicle body outer side) of the load detection sensor 30 in a vehicle body front side surface (vehicle body outer side surface) 36C of the load transmitting plate 36. The bumper touch sensor 26 is fixed with double-sided tape or the like to the vehicle body front side surface 36C of the load transmitting plate 36 via a band-like bracket 27.

Bumper absorber foam 40 that serves as a collision absorber is disposed at a site at the vehicle body outer side (vehicle body front side) of the load transmitting plate 36 and the bumper touch sensor 26, i.e., between the load transmitting plate 36 or the bumper touch sensor 26 and the bumper cover 14.

Convex portions 40A, 40B, 40C and 40D are formed facing the vehicle body inner side (vehicle body rear side) at predetermined intervals in the vehicle body vertical direction in a rear wall portion of the bumper absorber foam 40. The vertical-direction intermediate concave portions 40B 40C contact the vehicle body front side surface 36C of the load transmitting plate 36 in the vicinities above and below the bumper touch sensor 26.

A gap 42 between the bumper touch sensor 26 and a site 40E between the convex portion 40B and the convex portion 40C of the rear wall portion of the bumper absorber foam 40 narrows.

Of the convex portions 40A, 40B, 40C and 40D, the upper convex portion 40A and the lower convex portion 40D respectively contact an upper edge portion 36D and its vicinity and a lower edge portion 36E and its vicinity of the vehicle body front side surface 36C of the load transmitting plate 36.

An engagement pawl portion 40F is formed facing the vehicle body inner side (vehicle body rear side) at an upper end portion of the bumper absorber foam 40. An engagement pawl portion 40F is formed facing the vehicle body inner side (vehicle body rear side) at a lower end portion of the bumper absorber foam 40. The load transmitting plate 36 is nipped in the vehicle body vertical direction by the engagement pawl portions 40F and 40G of the bumper absorber foam 40, so that the bumper absorber foam 40 is prevented from moving in the vehicle body vertical direction with respect to the load transmitting plate 36 and the bumper reinforcement 20.

A front wall portion 40H of the bumper absorber foam 40 is substantially flat in the vehicle body vertical direction.

Next, the action of the present embodiment will be described.

Figure 2:
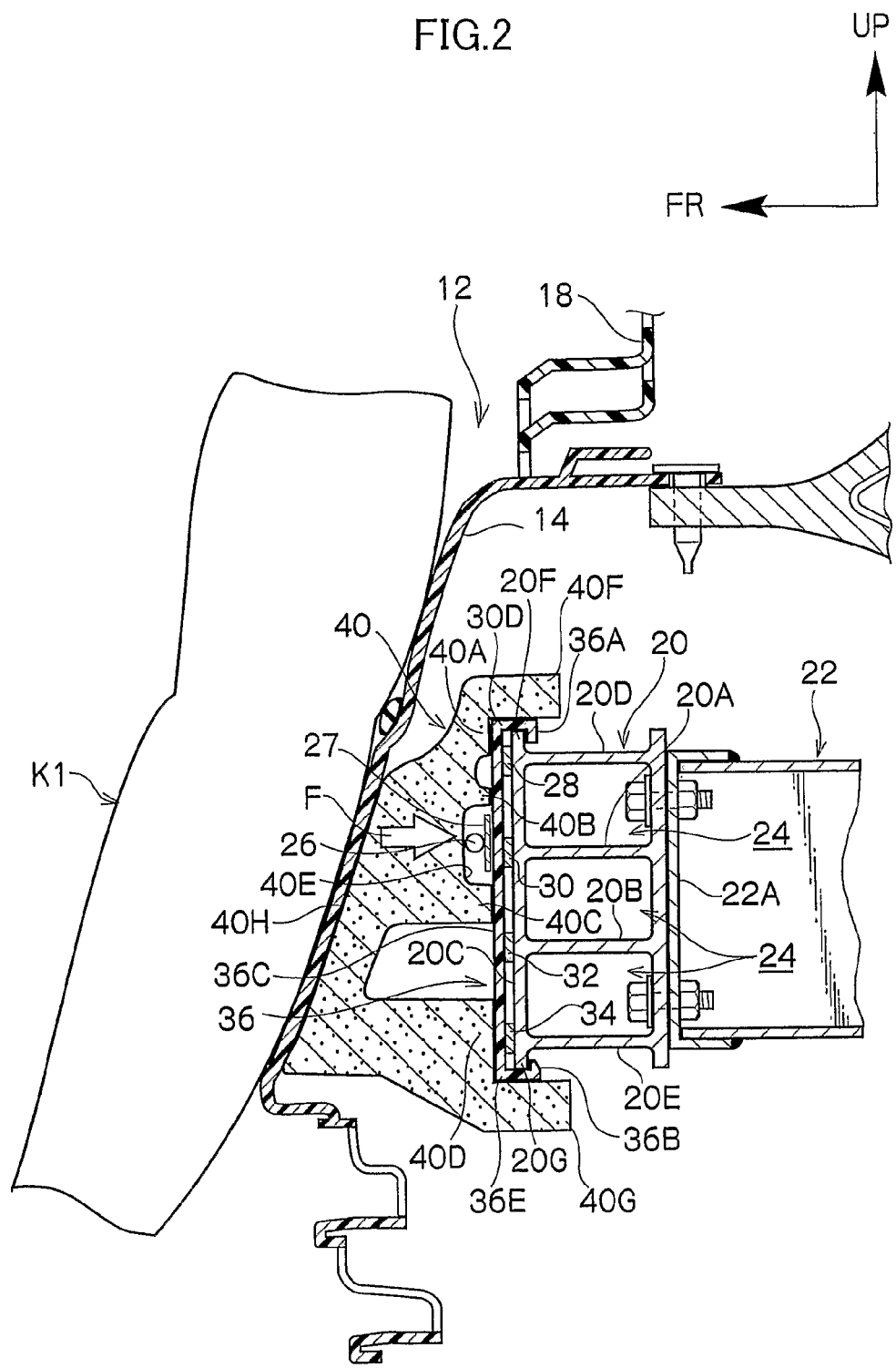
FIG. 2 is a side cross-sectional view showing a deformation state when a collision body contacts an upper side of a bumper in the vehicular bumper structure pertaining to the first embodiment of the invention.

In the present embodiment, when a collision body K1 collides with the front bumper 12 (FIG. 3), the bumper absorber foam 40 is pushed, together with the bumper cover 14 of the front bumper 12, from the vehicle body front side towards the vehicle body rear side by the collision body K1 (FIG. 2). As a result, the site 40E between the convex portion 40B and the convex portion 40C of the rear wall portion of the bumper absorber foam 40 contacts the bumper touch sensor 26, and a load F from the outside is transmitted to the bumper touch sensor 26.

In this case, in the present embodiment, the load detection sensors 28, 30, 32 and 34 are disposed at predetermined intervals in the vehicle body vertical direction between the load transmitting plate 36, at which the bumper touch sensor 26 is disposed, and the front wall portion 20C of the bumper reinforcement 20. The load transmitting plate 36 is configured so as to be displaced towards the vehicle body rear side with respect to the front wall portion 20C of the bumper reinforcement 20.

As a result, in the present embodiment, the entire collision load acting on the load transmitting plate 36 of the front bumper 12 due to the collision body K1 can be measured on the basis of each of the loads detected by the load detection sensors 28, 30, 32 and 34.

For this reason, in the present embodiment, it becomes possible to discriminate the collision body on the basis of the total value of the collision loads.

For example, in a case where the collision body K1, where the total value of the collision loads is relatively large, collides with the front bumper 12 (FIG. 3), and in a case where a collision body K2 (FIGS. 4 and 5), where the total value of the collision loads is relatively small, collides with the front bumper 12, it becomes possible to discriminate the collision body K1 and the collision body K2 on the basis of each of the loads detected by the load detection sensors 28, 30, 32 and 34. In particular, the detection performance of the collision body K1, where the total value of the collision loads for which collision detection is necessary is relatively large, is improved.

In the present embodiment, due to the engagement pawls 36A and 36B formed at both the upper and lower end portions of the load transmitting plate 36, the load transmitting plate 36 is engaged from the vehicle body front side with the upper end edge portion 20F and the lower end edge portion 20G of the front wall portion 20C of the bumper reinforcement 20. Thus, by attaching the load detection sensors 28, 30, 32 and 34 to the load transmitting plate 36 beforehand, the load transmitting plate 36 and the load detection sensors 28, 30, 32 and 34 can be easily attached to the bumper reinforcement 20. This contributes to the improvement of productivity.

Next, a second embodiment of the vehicular bumper structure of the invention will be described with reference to FIGS. 6 to 8.

With respect to members that are the same as those in the first embodiment, the same reference numerals will be given and description thereof will be omitted. Also, the IN arrow represents the vehicle width inner side direction.

Figure 6:
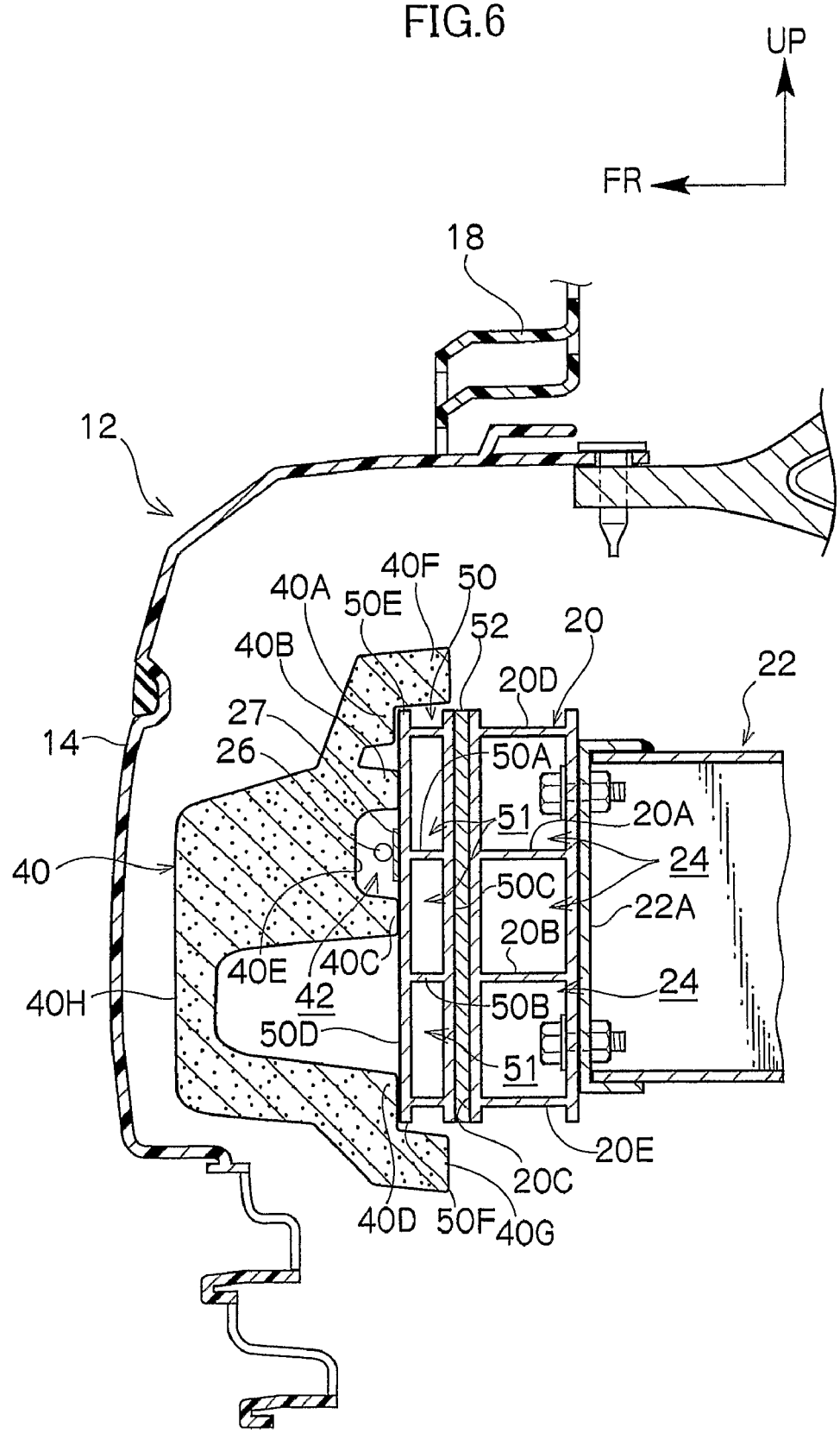
FIG. 6 is a side cross-sectional view showing a vehicular bumper structure pertaining to a second embodiment of the invention.

In the present embodiment, the side sectional shape of a load transmitting plate 50, which extends along the vehicle width direction and is configured by metal, includes a closed sectional portion 51 (FIG. 6). The closed sectional portion 24 is divided into three in the vertical direction by ribs 50A and 50B. The ribs 50A and 50B are formed along the vehicle longitudinal direction at predetermined intervals in the vehicle body vertical direction.

Figure 7:
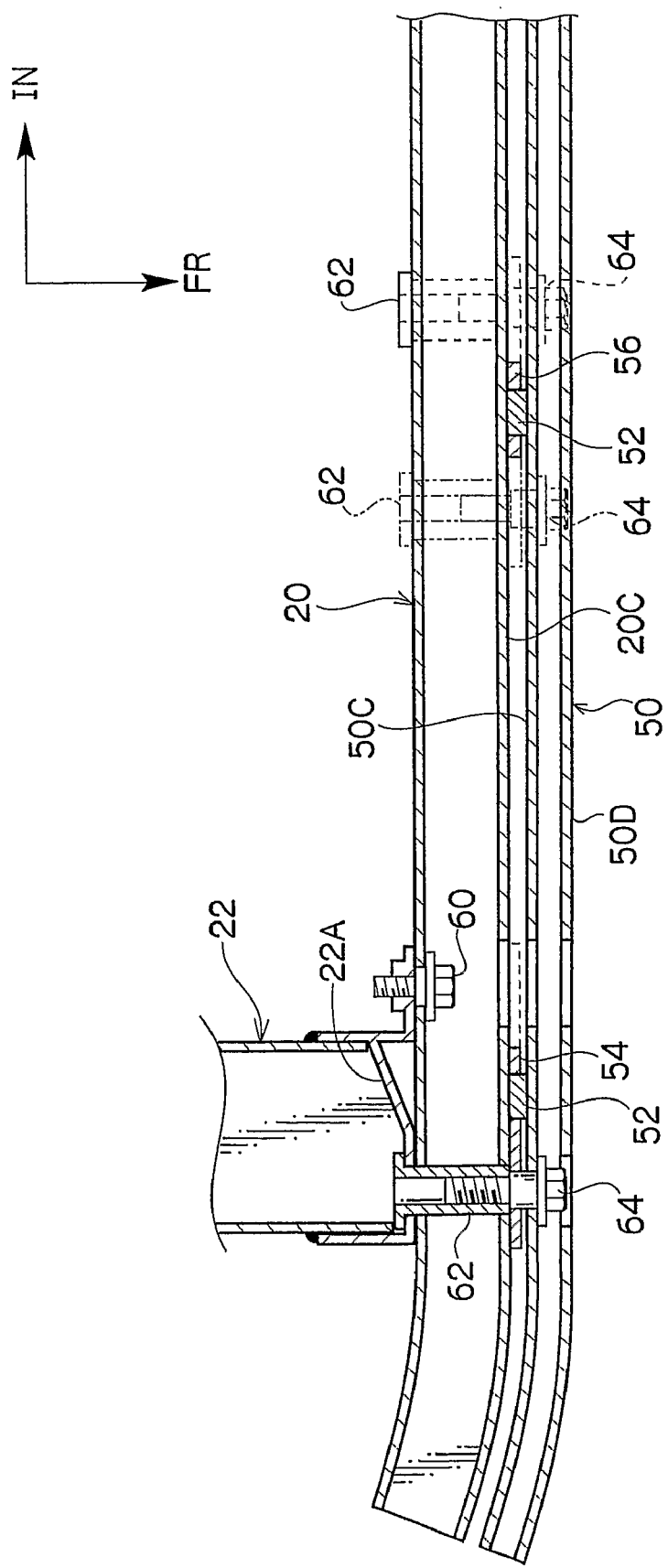
FIG. 7 is a plan cross-sectional view showing the relevant portions of the vehicular bumper structure pertaining to the second embodiment of the invention.

Load detection sensors 52 are disposed at predetermined intervals along the vehicle width direction along the vehicle body vertical direction between a vehicle body rear side surface (vehicle body inner side surface) 50C of the load transmitting plate 50 and the front wall portion 20C of the bumper reinforcement 20 (FIG. 7).

The load transmitting plate 50 is configured with a predetermined rigidity. The load transmitting plate 50 is configured so that when a load acts on the vehicle body rear side from the vehicle body front side, the load transmitting plate 50 does not contact the front wall portion 20C of the bumper reinforcement 20 at sites between the load detection sensors 52.

Figure 8:
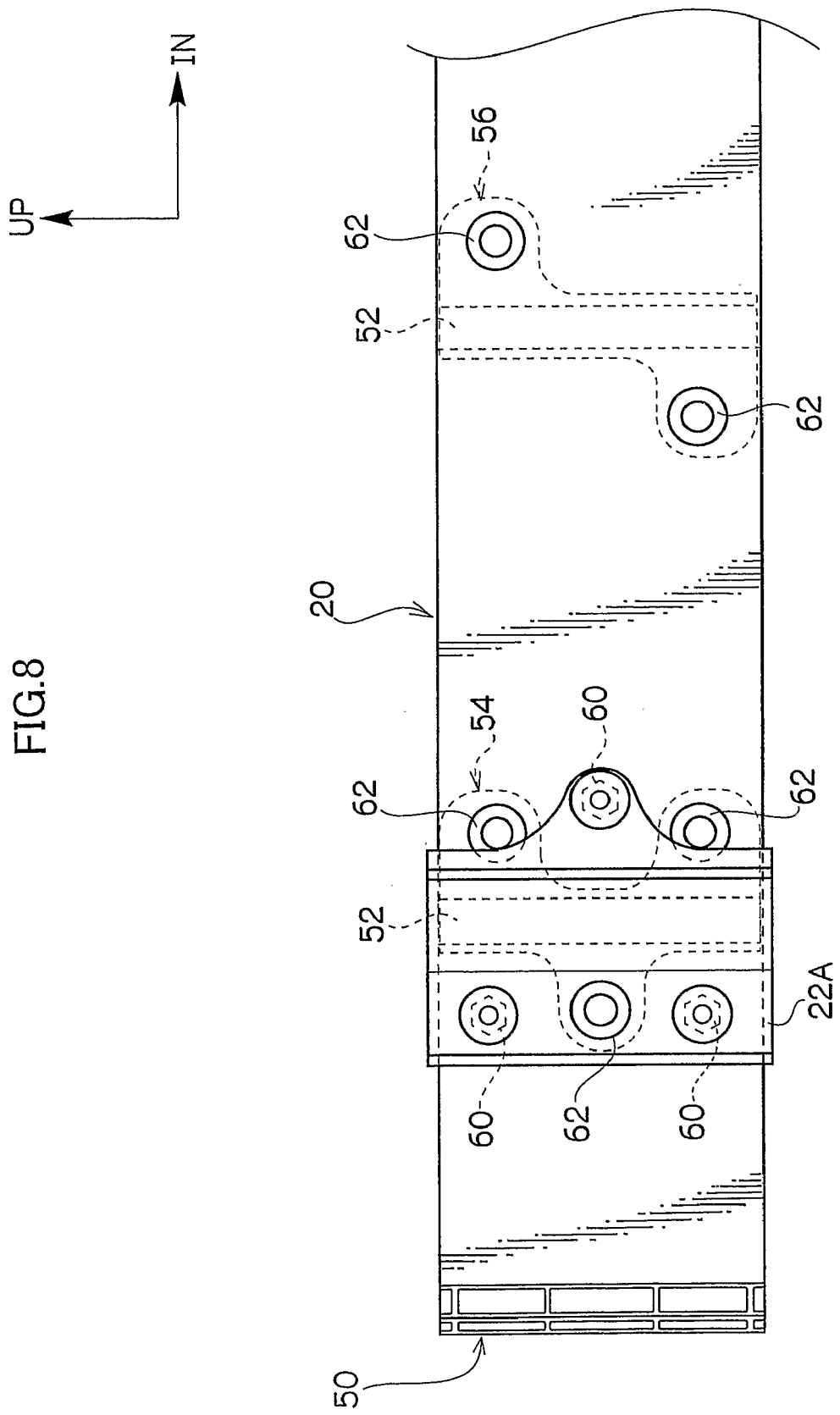
FIG. 8 is a front view seen from a rear side of the vehicle body showing the relevant portions of the vehicular bumper structure pertaining to the second embodiment of the invention.

The load detection sensors 52 are fixed to the bumper reinforcement 20 via brackets 54 and 56 (FIG. 8).

The bumper reinforcement 20 is fixed by fixing members 60, such as bolts or the like, to the front end portions 22A of the left and right front side members 22 (only the front side member 22 at the vehicle body right side is shown in FIG. 7). The load transmitting plate 50 is attached from the vehicle body front side by shoulder bolts 64 to nuts 62 fixed to the front end portions 22A of the left and right front side members 22 or the bumper reinforcement 20.

Thus, due to the nuts 62 and the shoulder bolts 64, the load transmitting plate 50 is prevented from moving in the vehicle body vertical direction with respect to the bumper reinforcement 20. Moreover, when a load acts on the load transmitting plate 50 from the vehicle body front side towards the vehicle body rear side, the load transmitting plate 50 is displaced towards the vehicle body rear side with respect to the front wall portion 20C of the bumper reinforcement 20, whereby the load acts on each of the load detection sensors 52.

A bumper touch sensor 26 that serves as a collision detection sensor is disposed along the vehicle width direction at a site at the vehicle body front side (vehicle body outer side) of the rib 50A at a vehicle body front side surface (vehicle body outer side surface) 50D of the load transmitting plate 50 (FIG. 6). The bumper touch sensor 26 is fixed with double-sided tape or the like to the vehicle body front side surface 50D of the load transmitting plate 50 via a band-like bracket 27.

Bumper absorber foam 40 that serves as a collision absorber is disposed at a site at the vehicle body outer side (vehicle body front side) of the load transmitting plate 50 and the bumper touch sensor 26, i.e., between the load transmitting plate 50 or the bumper touch sensor 26 and the bumper cover 14.

Convex portions 40A, 40B, 40C and 40D are formed facing the vehicle body inner side (vehicle body rear side) at predetermined intervals in the vehicle body vertical direction in the rear wall portion of the bumper absorber foam 40. The vertical-direction intermediate convex portions 40B 40C contact the vehicle body front side surface 50D of the load transmitting plate 50 in the vicinities above and below the bumper touch sensor 26.

A gap 42 between the bumper touch sensor 26 and a site 40E between the convex portion 40B and the convex portion 40C of the rear wall portion of the bumper absorber foam 40 narrows.

Of the convex portions 40A, 40B, 40C and 40D, the upper convex portion 40A and the lower convex portion 40D respectively contact an upper edge portion 50E and its vicinity and a lower edge portion 50F and its vicinity of the vehicle body front side surface 50D of the load transmitting plate 50.

An engagement pawl portion 40F is formed facing the vehicle body inner side (vehicle body rear side) at an upper end portion of the bumper absorber foam 40. An engagement pawl portion 40G is formed facing the vehicle body inner side (vehicle body rear side) at a lower end portion of the bumper absorber foam 40. The engagement pawl portions 40F and 40G of the bumper absorber foam 40 nip the load transmitting plate 50 in the vehicle body vertical direction, so that the bumper absorber foam 40 is prevented from moving in the vehicle body vertical direction with respect to the load transmitting plate 50 and the bumper reinforcement 20.

A front wall portion 40H of the bumper absorber foam 40 is substantially flat in the vehicle body vertical direction.

Next, the action of the present embodiment will be described.

In the present embodiment, when a collision body K1 collides with the front bumper 12 (FIG. 3), the bumper absorber foam 40 is pushed, together with the bumper cover 14 of the front bumper 12, from the vehicle body front side towards the vehicle body rear side by the collision body K1. As a result, the site 40E between the convex portion 40B and the convex portion 40C of the rear wall portion of the bumper absorber foam 40 contacts the bumper touch sensor 26, and the load from the outside is transmitted to the bumper touch sensor 26.

In this case, in the present embodiment, the plural load detection sensors 52 are disposed at predetermined intervals in the vehicle width direction between the load transmitting plate 50, at which the bumper touch sensor 26 is disposed, and the front wall portion 20C of the bumper reinforcement 20. Due to this configuration, the load transmitting plate 50 is displaced towards the vehicle body rear side with respect to the front wall portion 20C of the bumper reinforcement 20.

As a result, in the present embodiment, the entire collision load acting on the load transmitting plate 50 of the front bumper 12 due to the collision body can be measured on the basis of each of the loads detected by the plural load detection sensors 52 disposed at predetermined intervals in the vehicle width direction.

For this reason, in the present embodiment, it becomes possible to discriminate the collision body on the basis of the total value of the collision loads.

For example, in a case where the collision body K1, where the total value of the collision loads is relatively large, collides with the front bumper 12 (FIG. 3), and in a case where a collision body K2, where the total value of the collision loads is relatively small, collides with the front bumper 12 (FIG. 5), it becomes possible to discriminate the collision body K1 and the collision body K2 on the basis of each of the loads detected by the load detection sensors 52. In particular, the detection performance of the collision body K1, where the total value of the collision loads for which collision detection is necessary is relatively large, is improved.

Figure 9:
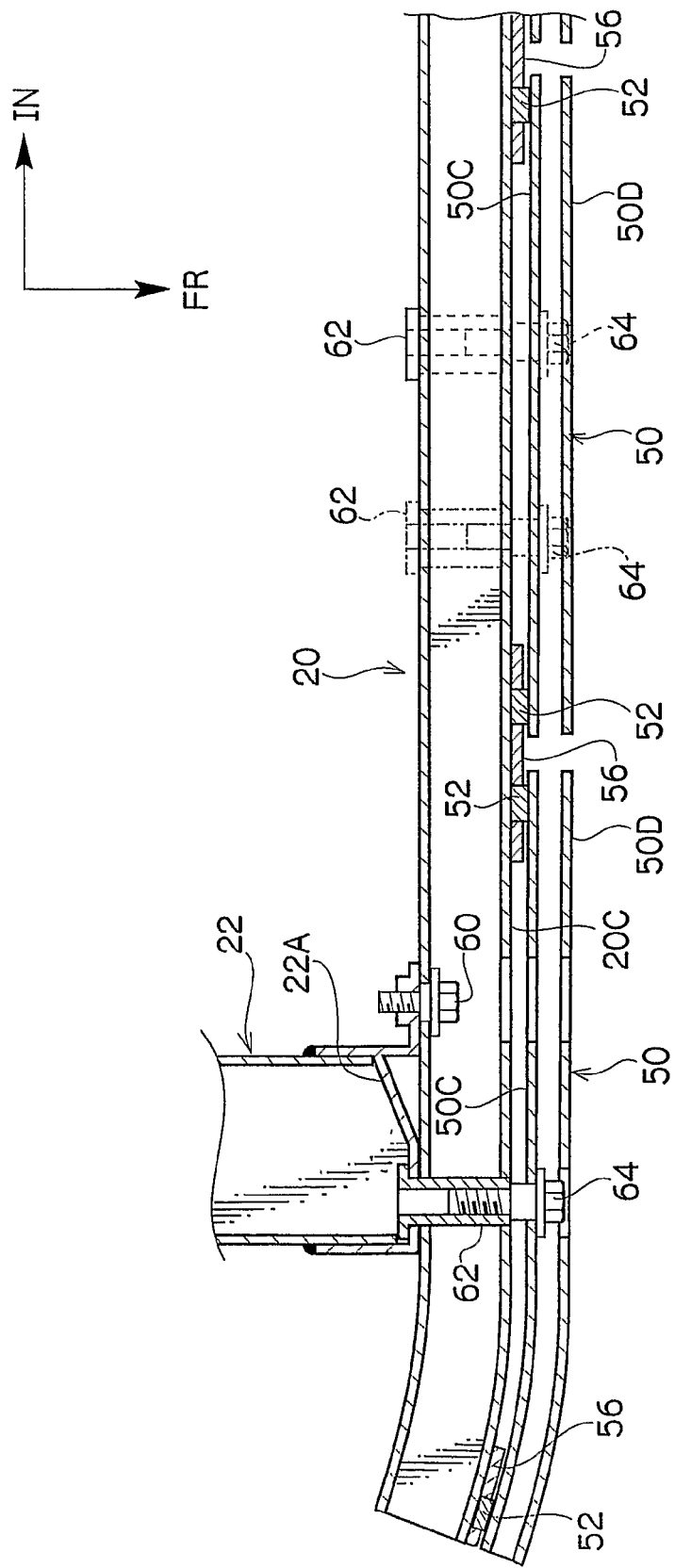
FIG. 9 is a plan cross-sectional view showing the relevant portions of a vehicular bumper structure pertaining to a modified example of the second embodiment of the invention.

As shown in FIG. 9, the second embodiment may also be configured so that the load transmitting plate 50 is plurally divided (e.g., into four) in the vehicle width direction, and so that a predetermined number of the load detection sensors 52 are disposed at predetermined intervals along the vehicle width direction along the vehicle body vertical direction between the vehicle body rear side surfaces (vehicle body inner side surfaces) 50C of the load transmitting plates 50 and the front wall portion 20C of the bumper reinforcement 20.

In the instance of the configuration shown in FIG. 9, the detection performance of the collision body, where the total value of the collision loads for which collision detection is necessary is relatively large, is improved, and it can be determined at which position in the vehicle width direction of the front bumper 12 the collision body contacted by mutually comparing the total value of the collision loads of the load detection sensors 52 dispersed in the vehicle width direction with respect to the load transmitting plates 50 divided in the vehicle width direction.

As a result, an operating mode of a collision body protection device is switchable on the basis of the positions in the vehicle width direction of the front bumper 12 at which collision bodies have contacted.

For example, the following operation becomes possible. In the case of a vehicle body 10 where air bags covering A pillar portions are disposed independently at the left and right, only the air bag covering the right-side A pillar portion is deployed when a control device determines, on the basis of the loads detected by the load detection sensors 52, that a collision body has contacted the right side of the front bumper 12. When the control device determines that a collision body has contacted the left side of the front bumper 12, only the air bag covering the left-side A pillar portion is deployed. When the control device determines that a collision body has contacted the vehicle width-direction intermediate portion of the front bumper 12, the air bags covering both the left- and right-side A pillar portions are deployed.

Figure 10:
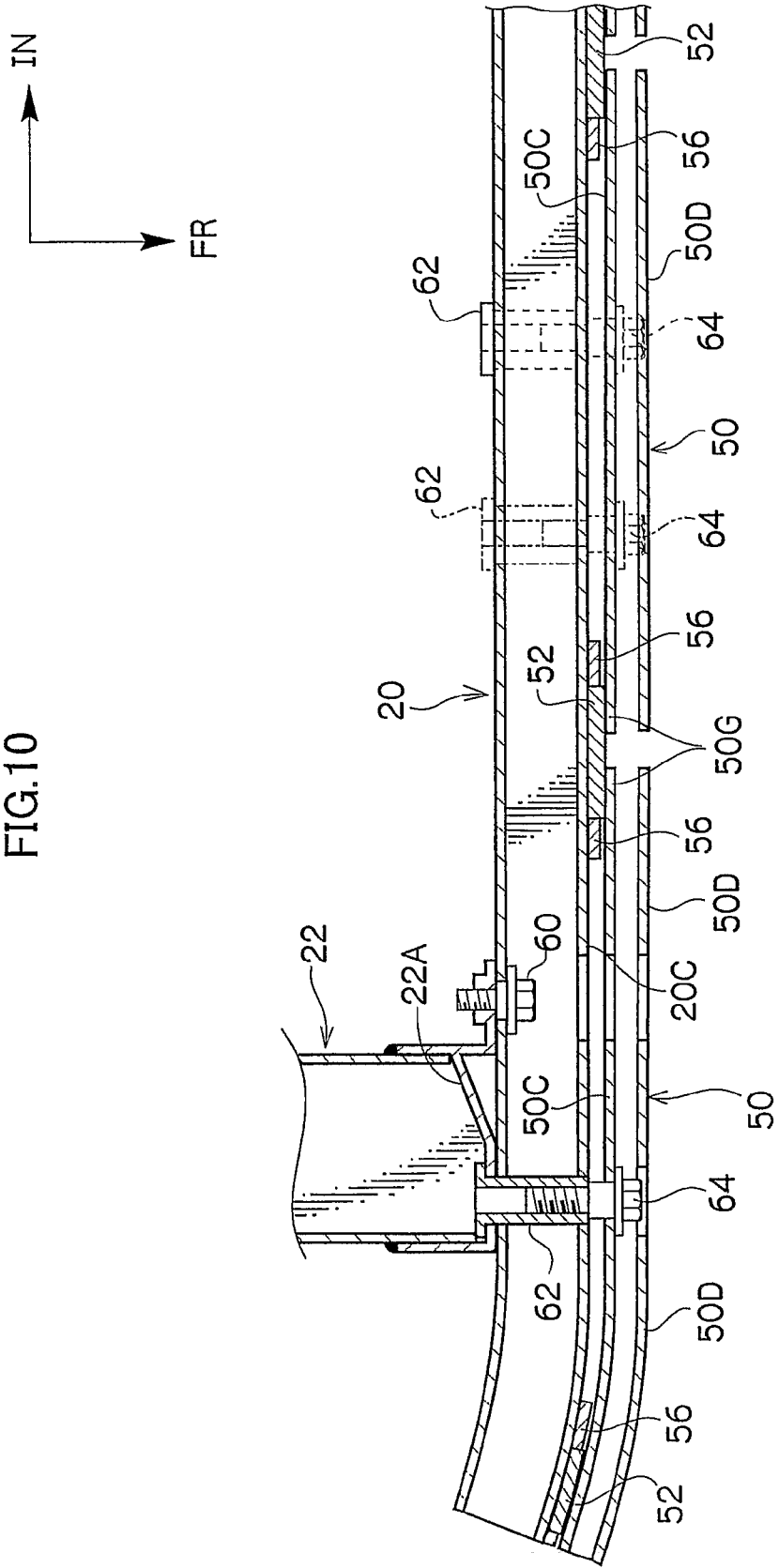
FIG. 10 is a plan cross-sectional view showing the relevant portions of a vehicular bumper structure pertaining to another modified example of the second embodiment of the invention.

As shown in FIG. 10, the number of load detection sensors 52 can be reduced by configuring the load detection sensors 52 contacting end portions 50G of adjacent load transmitting plates 50 with one load detection sensor.

The present invention has been described in detail above in regard to specific embodiments, but the present invention should not be construed as being limited to these embodiments. It will be apparent to those skilled in the art that other embodiments are possible within the scope of the invention. For example, the bumper touch sensor 26 may be eliminated, and the load (pressure) detection sensors 28, 30, 32 and 34 may also serve as collision detection sensors.

The side sectional shapes of the bumper reinforcement 20 and the load transmitting plate 50 are not limited to shapes having a closed sectional portion divided into three in the vertical direction by two ribs. They may also have shapes divided into two in the vertical direction by one rib. Also, the side sectional shapes of the bumper reinforcement 20 and the load transmitting plate 50 may also have shapes such as a ladder divided in the vertical direction by three or more ribs.

The materials of the load transmitting plates 36 and 50 are not limited to resin and metal, and may be other materials.

The number of divisions of the load transmitting plate 50 in the vehicle width direction is not limited to four, and may be another number such as three.

The vehicular bumper structure of the invention is also applicable to a bumper other than the front bumper 12, and is also applicable to a rear bumper.

The plural load detection sensors of the invention may also be dispersed and disposed in the vehicle body vertical direction.

When the plural load detection sensors are dispersed and disposed in the vehicle body vertical direction, the collision body can be discriminated by comparing the total of the collision loads detected by the load detection sensors at the vehicle body upper side with the total of the collision loads detected by the load detection sensors at the vehicle body lower side.

The invention may also be configured so that plural load detection sensors are dispersed and disposed in the vehicle width direction, and so that the load transmitting plate is divided in the vehicle width direction.

When plural load detection sensors are dispersed and disposed in the vehicle width direction and the load transmitting plate is divided in the vehicle width direction, the position of the collision in the vehicle width direction of the bumper can be identified by mutually comparing the total of the collision loads of the load detection sensors disposed in the vehicle width direction facing the load transmitting plates divided in the vehicle width direction.

The vehicular bumper structure of the invention includes a bumper reinforcement that extends along a vehicle width direction, plural load detection sensors disposed at a vehicle body outer side surface of the bumper reinforcement, and a load transmitting plate disposed at vehicle body outer side surfaces of the plural load detection sensors, whereby collision detection performance can be improved.

The invention claimed is:

1. A vehicular bumper structure comprising:
   a bumper reinforcement that extends along a vehicle width direction;
   a plurality of load detection sensors disposed at a vehicle body outer side surface of the bumper reinforcement;
   a load transmitting plate that is made of resinous material or metal, has predetermined rigidity, is disposed at vehicle body outer side surfaces of the plurality of load detection sensors, and is configured so as to be displaceable towards the vehicle body rear side with respect to a front wall portion of the bumper reinforcement;
   a bumper cover provided along a vehicle width direction; and
   a bumper absorbing member provided between the load transmitting plate and the bumper cover.

2. The vehicular bumper structure of claim 1, wherein the plurality of load detection sensors are dispersed and disposed in a vehicle body vertical direction.

3. The vehicular bumper structure of claim 1, wherein the plurality of load detection sensors are dispersed and disposed in the vehicle width direction, and the load transmitting plate is divided in the vehicle width direction.

4. A collision detection method applicable to a vehicular bumper system of claim 2, the method comprising:
   measuring, with the plurality of load detection sensors, loads resulting from at least one occurring impact;
   comparing the values of the loads measured by the plurality of load detection sensors; and
   discriminating at least one collision body on the basis of the result of measurement by the plurality of load detection sensors.

5. A method of switching a vehicular collision body protection device that is installed in the vehicular bumper structure of claim 3, the method comprising:
   measuring, with the plurality of load detection sensors, loads resulting from at least one occurring impact;
   comparing the values of the loads measured by the plurality of load detection sensors; and
   discriminating an occurrence position of the at least one occurring impact along a widthwise direction of a vehicle on the basis of the result of measurement by the plurality of load detection sensors.

* * * * *